United States Patent Office 3,201,357
Patented Aug. 17, 1965

3,201,357
VINYLATION REACTIONS AND MERCURIC SALT CATION EXCHANGE CATALYSTS THEREFOR
Fabian T. Fang, Levittown, Pa., and Irwin S. Fiarman, Levittown, N.J., assignors to Rohm & Haas Company, Philadelphia, Pa., a corporation of Delaware
No Drawing. Filed Apr. 25, 1962, Ser. No. 189,954
14 Claims. (Cl. 260—2.2)

This invention concerns vinylation reactions, catalysts therefor, and a method of preparing said catalysts. More specifically, it concerns vinylation reactions which are very effectively catalyzed with mercury salts of a sulfonic cation exchanger, which cation exchanger possesses a macroreticular structure, as will be further defined.

The use of mercury salts of sulfonic acid cation exchangers as catalysts in organic reactions is set forth in the prior art, an example of which is U.S. Patent 2,853,520, in which the use of a partial mercury salt of a "sulfonated polystyrene type (synthetic resin) . . ." is disclosed. Such cation exchange resins are prepared by the copolymerization of styrene with divinylbenzene, and subsequent sulfonation with a sulfonating agent such as sulfuric acid, oleum, chlorosulfonic acid, etc. The preparation of such resins is well-known and is described in detail in U.S. Patent 2,366,007. The reaction discussed in the patent first listed effects rearrangement of ethynyl hydroxyl compounds to ketonic, carbonyl or acetyl compounds by the use of mercury salts of the resins of the type described in the latter patent.

The sulfonic acid type resins described in the previous paragraph are the so-called "conventional" resins and are characterized by having low specific surface, the actual specific surface being determined by the geometry of the particles. The surface area of such resins, typified by the commercially available Amberlite IR–120 and Dowex–50X·8.5, as measured by the Brunnauer, Emmett and Teller method is always less than 1 sq. m./g., whereas the macroreticular sulfonic acid type cation exchangers, from which the mercury salts of the present invention are obtained, are characterized by high specific surfaces due to their macroreticular structure. Depending on the particular compositions employed, they may vary from 20 to in excess of 200 sq. m./g. Thus, they are a radically different type of sulfonic acid cation exchange resin and their mercury salts are particularly suited for the vinylation reactions set forth hereinafter. The mercury salts of the conventional resins, such as those described in U.S. Patent 2,853,520, are valueless as catalysts in the vinylation reactions of the present invention as clearly shown in Example XIII.

The catalysts of the present invention are prepared by treating a macroreticular-structured sulfonic resin with a salt such as mercuric acetate. Although mercuric acetate represents a preferred mercuric salt because it is soluble in both water and acetic acid, any mercuric salts which are soluble in the solvent being employed can be used. Thus, with an aqueous solvent, a water-soluble salt such as mercuric bromide can be used. Although acetic acid is preferred as a solvent for making the monosulfonic mercury salt, other liquid aliphatic carboxylic acids containing 1 to 8 carbon atoms can be used.

The term "macroreticular" structure as hereinafter used in the specification, examples and in the claims refers to a unique porous structure. It has been found that this structure is developed when monoethylenically unsaturated monomers are copolymerized with polyvinylidene monomers in the presence of certain compounds. Characteristic of these compounds is the fact that each is a solvent for the monomer mixture being copolymerized and exerts essentially no solvent action on said copolymer. For ease of reference hereinafter, such a compound will be termed "precipitant."

The ion exchange resins containing sulfonic acid groups prepared using said macroreticular-structured copolymers as intermediates also exhibit unusual and unexpected properties.

It is necessary that the precipitants form a homogeneous solution with the monomer. Further requirements are that the precipitants must be capable of exerting no solvent action on or being imbibed by the copolymer to any appreciable extent or the aforesaid unique properties will not be obtained in the copolymers produced. An additional requirement is that the precipitants must be chemically inert under the polymerization conditions; that is to say, they must not react chemically with any of the reactants or the suspending medium if one be used. A preferred class of precipitants are those which are liquid under the polymerization conditions.

The determination of the most effective precipitant and the amounts required for the formation of a particular copolymer with macroreticular structure may vary from case to case because of the numerous factors involved. However, although there is no "universal" or single class of precipitants applicable to all cases, it is not too difficult to determine which precipitants will be effective in a given situation. The requirements of solubility with the monomer mixture and non-solubility in the copolymer can be tested empirically and the solubilities of many monomers and copolymers are well-known from publications and textbooks.

Cross-linked copolymers are generally insoluble, but they will absorb or imbibe liquids which might be considered as being good "solvents." By immersing the cross-linked copolymer in liquids and determining the degree of swelling, a suitable precipitant can be chosen. Any liquids which are solvents for the monomer mixture, which give negligible swelling of the copolymer, which are chemically inert under polymerization conditions, and which are substantially insoluble in the suspending medium, if one be used, will function as precipitants.

As a further guide in the selection of a suitable precipitant, reference may be made to scientific literature, for instance, as discussed in Hildebrand and Scott, Solubility of Non-Electrolytes, 3d ed., New York, 1950. In general, it may be stated that sufficiently wide differences in the solubility parameters of polymer and solvent, respectively, must exist for the precipitant to be effective; and that, once an effective precipitant has been located, the behavior of many other liquids may be predicted from the relative position of the reference polymer and precipitant in published tables, within the accuracy of such published information. Furthermore, if the solubility parameter of a given polymer occupies an intermediate position in these tables, solvents with both higher or lower parameters may become effective.

A minimum concentration of any particular precipitant is required to effect phase separation. This is comparable to the observation that many liquid systems containing two or more components are homogeneous when some components are present in only minor amounts; but if the critical concentration is exceeded, separation into more than one liquid phase will occur. The minimum concentration of the precipitant in the polymerizing mixture will have to be in excess of the critical concentration. The amounts in excess of such critical concentration can be varied and they will influence to some extent the properties of the product so formed.

Too high a concentration of the precipitant may be undesirable for practical reasons since the rate of copolymerization may decrease and the space-time yields become low. In many cases, the amount of precipitant employed may be between 30% and 60% of the total weight of the monomer mixture and the precipitant.

Introduction of the precipitant leads to two effects, the second effect undoubtedly depending on the first. By adding the precipitant to the monomer phase, the solubility in the monomer phase of any copolymer formed is decreased and the copolymer separates from the monomer phase as it is formed. This phenomenon is known as "phase separation." As the concentration of monomer in the polymerizing mass decreases due to polymerization, and as the concentration of resulting copolymer increases, the precipitant is more strongly repelled by the copolymer mass and is actually squeezed out of the copolymer phase leaving a series of microscopic channels.

These microscopic channels are separate and distinct from the micropores which are present in all cross-linked copolymers as is well-known to those skilled in the art (cf. Kunin, "Ion Exchange Resins," pages 45 et seq., John Wiley & Sons, Inc., 1958). While said channels are relatively small in the commonly thought of sense, they are large when compared with the micropores hereinbefore referred to. Thus, as set forth hereinafter, the use of a precipitant results in the formation of an unusual and desirable macroreticular structure. It is postulated that this "liquid expulsion" phenomenon and the resulting macroreticular structure is responsible for the unusual and expected properties of the resultant copolymer. Since the rigidity of the polymer mass at the time of precipitant expulsion is important, it is not surprising that the desirable properties obtained increase with increasing polyvinylidene content, i.e. increasing degrees of cross-linking. As a specific example, using a sulfonated styrene-divinylbenzene copolymer, the process of the present invention is appreciably less effective below about 4% to 6% divinylbenzene content in the copolymer than it is at higher divinylbenzene levels. With this specific system, a range of divinylbenzene content from about 3% to 55% will give the desired effect. A particularly preferred range is from 20% to 55% divinylbenzene.

Precipitants suitable for the styrene-divinylbenzene copolymers which are preferred as intermediates for the sulfonic acid cation exchange resin catalysts of the present invention include alkanols with a carbon content of from 4 to 10, such as n-butanol, sec-butanol, tert-amyl alcohol, n-hexanol, and decanol. Higher saturated aliphatic hydrocarbons, such as heptane, isooctane, and the like can also function as precipitants in these systems.

For use as the catalyst in the process of the present invention, the preferred cation exchange resin is the nuclear sulfonic acid type. These resins can be prepared, for example, by sulfonating a copolymer of styrene and a polyvinylidene monomer, such as divinylbenzene, trivinylbenzene, as well as polyvinyl ethers of polyhydric alcohols, such as divinoxyethane and trivinoxypropane, which resins have been prepared by the process set forth hereinbefore. The sulfonating agent may be concentrated sulfuric acid, oleum, or chlorosulfonic acid. A typical preparation is as follows:

A mixture of styrene (121.6 grams) technical divinylbenzene (38.4 grams containing 50% active ingredient), 87 grams of tertiary amyl alcohol and 1 gram of benzoyl peroxide was charged to a solution of 6.5 grams of sodium chloride and 0.5 gram of the ammonium salt of a commercial styrene-maleic anhydride copolymer in 174 grams of water. The mixture was agitated until the organic components were dispersed as fine droplets and then heated to 86° to 88° C. for six hours.

The resultant polymer pearls were filtered and washed with water and freed from excess water and amyl alcohol by drying at elevated temperature. The product was obtained in the form of white opaque spherical or spheroidal particles amounting to 145 grams. When the dried product was dropped into a fluid such as hexane, fine bubbles were seen to rise from the immersed particles due to displacement of air held within the void spaces of the resin by the organic fluid.

This copolymer was converted to the sulfonic acid derivative by heating with agitation 75 grams of the copolymer with 750 grams of 99% sulfuric acid at 118° C. to 122° C. for six hours. The mixture was then cooled to about 20° C. and diluted with water. The diluted acid was removed by filtration and the resin washed with deionized water until free of acid.

The deionized water used had a quality of $10^6$ ohm-cm. and the washing was continued until the effluent from the wash had a value of $10^6$ ohm-cm.

As has been set forth hereinbefore, the ratios of styrene to divinylbenzene can be varied widely, and other polyvinylidene cross-linking agents can be employed. The amount of precipitant can also be varied over the range hereinbefore set forth, and other precipitants of the type set forth hereinbefore can be successfully employed.

Although styrene is the preferred monovinyl aromatic monomer because of the availability and low cost, other monovinyl aromatic compounds can be used. Typical of such are vinyl toluene, vinyl xylene, $\alpha$- and $\beta$-alkylstyrenes, vinyl naphthalenes and vinyl alkylnaphthalenes.

For use as catalysts in the present invention, it is preferred to suspension copolymerize a mixture of monomers and precipitant, since beads of controllable size can be obtained. Methods of suspension polymerizing are well-known in the art.

Although it is preferred that the copolymer contain the maximum possible number of benzene nuclei, since the sulfonation reaction sulfonates the benzene ring, thus making available more sites for reaction with the mercury salt employed, it is possible to modify the properties of the copolymers by copolymerizing with the two monomers, such as styrene and divinylbenzene, additional monoethylenically unsaturated monomers. Typical of such would be the alkyl esters of acrylic and methacrylic acids, acrylonitrile, vinyl chloride, vinyl acetate and the like.

The size of the particles is an important criterion in the use of these resins as catalysts. The rate of reaction is inversely proportional to the particle size of the resins so that as fine particle size as can be conveniently handled gives the fastest rate. For ease of filtration or, if it is preferred, to run continuously by having the resin catalyst held in a column, a compromise is generally made on the particle size of the resin and, with the present catalysts, it is generally not necessary to use a resin finer than 50 mesh. With the highly mercurated versions of these catalysts, an adequate reaction rate is generally obtained with the particle size of 20 to 40 mesh.

As set forth hereinbefore, these resins are characterized by very high specific surface, the specific surface value being governed by a combination of factors, principal of which are the amount of precipitant employed and the amount of cross-linker. In the case of the styrene-divinylbenzene based resins, a 50% divinylbenzene resin prepared in the presence of about 30% to 35% (based on the weight of the monomers and the precipitant) of a precipitant such as methylisobutyl carbinol will show very high specific surface, in excess of 200 sq. m./g. Although a 20% divinylbenzene resin similar to the above was an effective catalyst, the 50% divinylbenzene resin showed an appreciably higher rate of conversion.

The mercury salts are prepared by reacting the acid form of the sulfonic resin with a mercury salt, such as mercuric acetate, in a solvent. The temperature at which the resin is reacted wth the mercury salt affects the nature of the catalyst produced and it is postulated that the following reactions take place ("R" is used to designate the copolymer backbone or resin). These reactions are those of the acetate and acetic acid. As set forth hereinafter, acids and mercuric salts other than acetic and acetate can be employed.

(1)
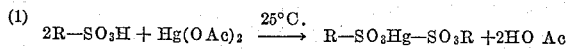
$$2R-SO_3H + Hg(OAc)_2 \xrightarrow{25°C.} R-SO_3Hg-SO_3R + 2HOAc$$

(2)
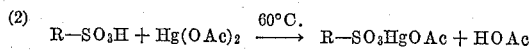
$$R-SO_3H + Hg(OAc)_2 \xrightarrow{60°C.} R-SO_3HgOAc + HOAc$$

The nature of the solvent in which the mercuric salt of the resin is prepared also affects the nature of the product produced; thus Equations 1 and 2 show the products postulated for the reaction in acetic acid, while in water at 25° C. the product is the same as that shown in Equation 1, but at 60° C., the following reaction occurs:

(3)
$$R-SO_3H + Hg(OAc)_2 + H_2O \xrightarrow{60°C.} R-SO_3-Hg-OH + 2HOAc$$

If the mercuration is carried out in a non-aqueous medium, such as vinyl acetate, which also takes part in the vinylation reaction, then the product is as shown in Equation 5:

(5)
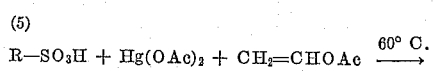
$$R-SO_3H + Hg(OAc)_2 + CH_2=CHOAc \xrightarrow{60°C.}$$
$$R-SO_3Hg-CH_2CH(OAc)_2 + HOAc$$

A preferred catalyst is that prepared according to the method set forth in Equation 2 in which the acid form of the macroreticular-structured sulfonic resin is heated at 60° C. in acetic acid with mercuric acetate for 1 to 24 hours. The resin is recovered by filtration, washed with glacial acetic acid and dried, generally in vacuo, at about 60° C. This gives the monosulfonate as shown in the equation and this is a preferred catalyst, primarily because it contains a high mercury content per pound of resin. Thus, it will frequently give a faster rate and/or higher conversion than the disulfonate, due, it is postulated, primarily to its higher mercury content.

While, for reasons of economy and ready availability, acetic acid is the preferred acid for use in the preparation of the mercuric salt of the resin, and mercuric acetate is the preferred mercuric salt, other aliphatic acids and their corresponding mercuric salts can be used. In general, alkanoic acids containing 1 to 8 carbon atoms and their corresponding mercuric salts can be employed.

As indicated hereinbefore, the mercury content of the resin determines its efficiency. Naturally, it is possible by using less than 1:1 molar ratios of resin to the mercuric salt to produce almost any degree of mercuration desired. However, for use in the vinylation and transvinylation reactions, the highest degree of mercuration is desired. Despite the prolonged reaction periods and the relatively elevated temperature employed, it does not appear that the resin is completely mercurated since it has some residual cation exchange capacity as measured by the salt-splitting test. This test is well-known to those skilled in the ion exchange art. However, mercuration has been carried out to the point where the resin only has 0.07 meq./g. and, in this particular instance, from an original capaicty of 4.87 meq./g.

Transvinylations may be represented by the following equation:

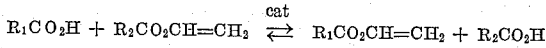
$$R_1CO_2H + R_2CO_2CH=CH_2 \underset{}{\overset{cat}{\rightleftarrows}} R_1CO_2CH=CH_2 + R_2CO_2H$$

The reaction is well-known and has been studied widely. The prior art employs a homogeneous catalyst, and this leads to difficulties.

The numerous difficulties which result from the use of homogenous catalysts are set forth in considerable detail in the specification, and numerous patents have issued, some of which employ cumberson multiple step processes for overcoming at least some of these difficulties. Thus, as set forth in U.S. 3,000,918, column 3, lines 3 to 13:

"Ethylidene diesters are particularly likely to be formed during the distillation of vinyl acetate and acetic acid from the reaction mixture, with consequent loss of vinyl acetate. The ethylidene diesters may decompose during the final distillation of the product, furthermore, forming acetaldehyde and acetic anhydride. The mercury salts present in the reaction mixture are then reduced by the acetaldehyde to metallic mercury, which frequently distills over and is found in the purified product. Acetaldehyde in the distillation process also causes bumping, frothing and other process difficulties."

As also set forth in British Patent 869,830 at page 7, lines 24 to 37:

"The neutralization of the active catalyst is important and should be done as soon as possible because the reaction can reverse itself quite rapidly in the presence of the active catalyst if very much of the acetic acid is permitted to remain in the reaction product. The neutralization is also important to prevent other undesirable effects which might result from the presence of the active catalyst in the reaction product such as polymerization, decomposition, excessive color formation and the like during the removal of the unreacted vinyl ester reactant or by other subsequent treatments."

Thus, it is clear from these two prior art references alone that numerous difficulties can be encountered and very frequently are when using homogeneous catalysts.

Thus, a heterogeneous catalyst which could be readily removed by simple mechanical means, e.g., filtration, and which would not have to be chemically "destroyed" would be a marked advance in the art. As set forth hereinbefore, the so-called conventional gel resins, the mercury salts of which could be considered for use as catalysts in the heterogeneous system, are completely ineffective insofar as transvinylation is concerned.

Another advantage of the cataylsts of the present invention lies in the fact that they may be used in a continuous process by packing the resin particles in a column and circulating the mixture of acid and vinyl ester through the column. The recycling can be stopped when any desired degree of conversion is attained. Using the direct vinylation process, a mixture of acetylene and the acid, dissolved in a solvent if the acid is not liquid at operating temperatures, is passed upward through a column of the resin and recycled, if necessary. Particularly for scale-ups, such continuous processes have the obvious advantage of continuous processes. In many cases, it will not be necessary to recycle the reactants and the use of multiple columns or appreciably columns will give the desired conversions in one pass.

Unexpectedly it has been found that the mercuric salts of marcroreticular-structured sulfonic acid type resins function very effectively as heterogeneous catalysts for vinylation reactions.

Vinylation of organic acids using the mercuric catalysts of the present invention can be effected in two ways. The vinylation can be effected by reacting the acid with a vinyl ester, thus effecting transvinylation. However, these mercuric salts are also very effective in the so-called "direct" vinylation in which acetylene is added to the acid molecule. Vinylation by the direct addition of acetylene has at least one advantage, namely, that the reaction mixture is not contaminated with by-products and the desired products are readily recovered in a high state of purity.

The transvinylation reactions of the present invention are carried out by mixing the acid to be vinylated with vinyl esters in the presence of a mercury salt of a macroreticular-structure sulfonic acid resin and maintaining the mixture at the desired temperature.

Other vinyl ester reactants or transvinylation agents can be used to transvinylate the acids in place of vinyl acetate according to this invention, including vinyl propionate, vinyl butyrate, viny valerate, vinyl hexoate, vinyl heptanoate and the like. When using vinyl ester reactants other than vinyl acetate, the corresponding acid of the vinyl ester reactant will be formed. We have found that particularly effective results are obtained when vinyl acetate is used as a transvinylation agent. Vinyl acetate forms acetic acid as a by-product acid and we have found that acetic acid can be readily and easily removed from the reaction medium by entrainment in vinyl acetate vapor and at a temperature sufficiently low to prevent degradation or polymer formation in the reaction mixture. Acetic acid entrained in vinyl acetate vapor is also easily recovered therefrom in pure form permitting efficient recycle of pure vinyl acetate vapor to the reaction mixture to remove more acetic acid. The use of esters higher than vinyl acetate generally requires higher reaction temperatures and in some instances, reduced pressures may be necessary to maintain low reaction temperatures to prevent degradation and polymer formation in the reaction mixture.

Another reason for preferring vinyl acetate as the vinylating agent is that it is low in cost and readily available.

Because one of the reactants is a polymerizable monomer, and the desired product is also a polymerizable monomer, it is frequently desirable to employ a polymerization inhibitor in the reaction mixture. The use of inhibitor and the amount used depends on several factors, such as the reactivity of the vinyl reactant and the vinyl product or, in the case of reactions involving unsaturated acids, the reactivity of these unsaturated acids. The well-known inhibitors are employed, typical of which are hydroquinone, t-butylcatechol and the methyl ether of hydroquinone, copper salts, such as cupric acetate, etc. The amounts may vary from 0.01% to 0.5% based on the weight of the reactants.

A solvent which is inert under the reaction conditions may be employed but particularly when vinyl acetate is used, the reaction mixture is invariably sufficiently fluid that no solvent is required.

The reaction temperature will vary between 0° C. and 100° C. depending on the reactants employed. Since there is present in the reaction mixture at the outset a polymerizable monomer, the reactions should be run at as low a temperature as possible. Generally, a temperature in the range of 10° to 60° C. is sufficiently high to effect reaction without causing any appreciable amount of polymerization of either monomer.

The reaction time required will vary depending on the acid being vinylated and the vinylating agent. In general, a reaction time of 1 to 24 hours is adequate.

The ratio of the compound to be vinylated to the vinyl ester can be varied appreciably and still be within the scope of this invention, but a preferred embodiment employs an excess of the vinyl ester. Thus, in the case of the acids enumerated hereinafter and with vinyl acetate as the vinylating agent, ratios of acid to vinyl acetate of from 1 to 1, to 1 to 15 are found to give effective conversions in a reasonable period of time.

The amount of resin used will also affect the rate and amount of conversion and from about 1% to about 20%, based on the weight of the reactants, is generally employed. With the monosulfonic mercuric salt hereinbefore described, from about 1% to 10% should be employed. Since the resin is readily recoverable, higher amounts can be used but little advantage is noted. When operating with a column or continuous reactor, and particularly if repeated recycles are involved, then the solution of the acid being treated comes in contact with a very much larger quantity of resin which frequently results in a high degree of conversion.

One class of compounds which can be effectively vinylated are carboxylic acids. Unsaturated caboxylics may be employed, typical of which are acrylic acid, methacrylic acid, itaconic acid, 3-butenoic and 4-pentenoic acids which are transvinylated under milder reaction conditions to give bifunctional monomers. The lower aliphatic acids such as chloroacetic, butyric, and 2-ethylhexanoic acids can be vinylated using the catalyst of the present invention. Mixtures of fatty acids, such as the fatty acids derived from linseed oil, tung oil, soybean oil and safflower oil can also be employed. The use of the heterogeneous catalysts of the present invention is particularly advantageous with this particular type of compound since the destruction of a homogeneous catalyst in such a reaction mixture would cause soap formation which would be particularly objectionable.

Aromatic acids can also be employed and typical of these are benzoic acid, phthalic acid, isophthalic acid, terephthalic acid and naphthoic acids.

Typical of the polycarboxylic acids which can be transvinylated are the dibasic aromatic acids hereinbefore set forth and the aliphatic dibasic acids, such as adipic, succinic, sebacic and malic acids which, by transvinylation, are converted to their vinyl esters.

A wide variety of substituted carboxylic acids can also be vinylated with the mercurated resins of this invention. As listed hereinbefore, chloro-substituted acetic can be used. Hydroxysuccinic (malic) acid can also be successfully vinylated.

The hereinbefore described acids can also be vinylated by the direct addition of acetylene in the presence of mercury catalysts. As in the case of the transvinylations, it has been found that the mercury salts of macroreticular-structured sulfonic acid cation exchange resins, such as described hereinbefore, are very effective catalysts and offer many advantages. One of the advantages is that they are so reactive as catalysts that the direct vinylation can be carried out at appreciably lower temperatures than is possible with other catalysts. Since side reactions leading to the formation of ethylidene esters are prominent at high temperatures, the use of these catalysts is decidedly advantageous.

They make possible the possibility of continuous processes, either in the vapor or liquid phase, and in such processes a tower or column is packed with the mercury salt of the resin, the mixture of the acid and acetylene passed therethrough.

This direct vinylation process offers an advantage over the transvinylation reaction which gives the same product in that transvinylations are equilibrium reactions and it is difficult to shift the equilibrium by known means.

The compounds of the present invention are known and are recognized as valuable polymerizable monomers. The monovinyl compounds can be used for the preparation of homopolymers which are valuable as protective coatings. The divinyl- or polyvinyl compounds of the present invention can be used in a known manner as cross-linkers to give what are substantially "thermoset" copolymers. They may be copolymerized with styrene, acrylic esters and the monovinyl esters can be cross-linked with the divinyl or polyvinyl esters of the present invention or may be cross-linked with more conventional cross-linkers, such as divinylbenzene, divinyltoluene, trivinylbenzene and the like. The softer polymers such as those prepared by copolymerizing the vinyl esters of the present invention with an acrylate, such as ethyl acrylate, are suitable for use as adhesives or as caulking compounds. As indicated, the utility for these monomers is well-known to those skilled in the art.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted:

PREPARATION A

A mixture of styrene (96 grams), technical divinylbenzene (64 grams containing 50% active ingredient), tertiary amyl alcohol (87 grams) and benzoyl peroxide (1 gram) is charged to a solution of sodium chloride (6.5 grams) and the ammonium salt of a commercial styrene-maleic anhydride copolymer (0.5 gram) in water (174 grams). The mixture is agitated until the organic components are dispersed as fine droplets and then heated to 86° to 88° C. for 6 hours.

The resultant polymer pearls are filtered, washed with water, and freed from excess water and the amyl alcohol by drying at elevated temperature. The product is obtained in the form of white opaque spherical or spheroidal particles amounting to 145 grams.

This copolymer, which contains 20% divinylbenzene, is converted to the sulfonic acid derivative by heating with agitation a 75-gram portion with 99% sulfuric acid (750 grams) at 118° to 122° C. for 6 hours. The mixture is then cooled to about 20° C. and diluted with water. The diluted acid is removed by filtration and the resin washed with deionized water until free of acid.

PREPARATION B

A mixture of styrene (98 grams), commercial divinylbenzene (669 grams containing 57.4% active ingredient), methylisobutylcarbinol (378 grams) and benzoyl peroxide (7.5 grams) is charged to a solution of sodium chloride (37.5 grams), sodium bicarbonate (5.8 grams) and the ammonium salt of a commercial styrene-maleic anhydride copolymer (11.5 grams) in water (1040 grams). The mixture is stirred until the monomers are homogeneously dispersed and then heated to 78° to 85° C. for 5 hours.

The resultant polymer pearls are filtered, washed with water, and freed from excess water and the carbinol by drying at elevated temperature. The product is obtained in the form of white opaque spherical or spheroidal particles amounting to 620 grams. It is considered to contain 50% divinylbenzene.

The copolymer beads are converted to the sulfonic acid derivative by heating with agitation a 273-gram portion with 99% sulfuric acid (1670 grams) at 120° C. for 5 hours. The mixture is then cooled to 40° C. and treated with crushed ice and water. The diluted acid is removed by filtration and the resin washed with deionized water until free of acid.

*Example I*

A mixture of mercuric acetate (40.0 grams, 126 millimoles) and vinyl acetate (560 grams) is heated to 60° C. A dried macroreticular sulfonic acid resin (−20+30 mesh, salt-splitting cation capacity 4.84 milliequivalents per gram; 67.5 grams, 324 milliequivalents), as prepared under conditions described in Preparation A and dried at 100° C. under a vacuum of 0.1 mm. for 16 hours, is added. The reaction mixture is maintained at 60° C. with stirring for 16 to 17 hours. The treated resin is collected by filtration, rinsed with vinyl acetate, and dried in vacuo at 60° C. The dried mercury derivative has a salt-splitting cation capacity of 2.35 milliequivalents per gram.

*Example II*

A mixture of mercuric acetate (23 grams, 73 millimoles) and glacial acetic acid (400 grams) is heated to 60° C. A dried macroreticular sulfonic acid resin (−30+60 mesh, salt-splitting cation capacity 3.66 milliequivalents per gram; 20 grams, 73 milliequivalents), as prepared under conditions described in Preparation B and dried at 100° C. under a vacuum of 0.1 mm. for 16 hours, is added. The reaction mixture is maintained at 60° C. with stirring for 16 to 17 hours. The treated resin is recovered by filtration, washed with glacial acetic acid, and dried in vacuo at 60° C. The dried mercury derivative has a residual salt-splitting cation capacity of 0.07 milliequivalent per gram.

*Example III*

A mixture of mercuric acetate (24 grams, 77 millimoles) and deionized water (250 grams) is heated to 60° C. A dried macroreticular sulfonic acid resin (−30+40 mesh, salt-splitting cation capacity 4.82 milliequivalents per gram; 16 grams, 77 milliequivalents), as prepared under conditions described in Preparation A and dried at 100° C. under a vacuum of 0.1 mm. for 16 hours, is added. The reaction mixture is maintained at 60° C. with stirring for 16 to 17 hours. The treated resin is collected by filtration, rinsed with deionized water, and dried in vacuo at 60° C. The dried mercury derivative has a residual salt-splitting cation capacity of 0.10 milliequivalent per gram.

*Example IV*

*Benzoic acid.*—A mixture of benzoic acid (113 grams, 0.93 mole) and vinyl acetate (344 grams, 4.0 moles) is heated to 60° C. to form a homogeneous solution, and a mercury resin catalyst (10 grams), as prepared in Example II, is added. The reaction mixture is maintained at 60° C. with stirring for 2 hours, decanted from the solid catalyst, washed with water and aqueous sodium bicarbonate solution, and then distilled through a Vigreux column to give vinyl benzoate (90 grams, 66% yield), boiling at 60–61° C. (2.5 mm.).

*Example V*

*Methacrylic acid.*—A mixture of glacial methacrylic acid (86 grams, 1.0 mole) and vinyl acetate (344 grams, 4.0 moles) with cupric acetate (0.1 gram) is heated to 40° C., and a mercury resin catalyst (24 grams), as prepared in Example II from a sulfonic acid resin described in Preparation A, is added. The reaction mixture is maintained at 40° C. with stirring for 16 hours, decanted from the solid catalyst, washed with water and aqueous sodium carbonate solution, dried over sodium sulfate, and then distilled through a Vigreux column to give vinyl methacrylate (62 grams, 55% yield), B.P. 50–53° C. (70 mm.).

*Example VI*

*Lauric acid.*—A mixture of lauric acid (400 grams, 2.0 moles), vinyl acetate (1720 grams, 20.0 moles) and cupric acetate (0.5 gram) is heated to 40° C., and a mercury resin catalyst (80 grams) of the composition used in Example V, is added. The reaction mixture is maintained at 40° C. with stirring for 5 hours, filtered from the heterogeneous catalyst, washed with water, and then distilled to give vinyl laurate (343 grams, 75% yield), B.P. 102–103° C. (0.75 mm.).

$C_{14}H_{26}O_2$: Calculated: C, 74.3%; H, 11.5%. Found: C, 75.0%; H, 11.8%.

*Example VII*

*Linseed oil fatty acid.*—A mixture of linseed oil fatty acid (28 grams, 0.1 mole) and vinyl acetate (129 grams, 1.5 moles) is heated to 40° C., and a mercury resin catalyst (6 grams) of the composition used in Example V, is added. The reaction mixture is maintained at 40° C. for 3.6 hours, and a conversion of 97% is determined by titrating an aliquot for the appearance of acetic acid. Work-up of the reaction mixture by decantation from the solid catalyst and stripping of all volatile components leads to an essentially acid-free mixture of vinyl esters of linseed oil fatty acids.

*Example VIII*

*3-butenoic acid.*—A mixture of 3-butenoic acid (8.6 grams, 1.0 mole) and vinyl acetate (86 grams, 1.0 mole) with cupric acetate (0.1 gram) is heated to 45° C., and a mercury resin catalyst (6 grams) of the composition used in Example V is added. The reaction mixture is maintained at 45° C. with stirring for 16 hours, decanted from the solid catalyst, washed with water and aqueous sodium bicarbonate solution, and then distilled through a Vigreux column to give vinyl 3-butenoate (7.8 grams, 69% yield).

$C_6H_8O_2$: Calculated: C, 64.30%; H, 7.14%. Found: C, 64.63%; H, 7.20%.

Example IX

*4-pentenoic acid.*—A mixture of 4-pentenoic acid (1000 grams, 10 moles), vinyl acetate (3010 grams, 35 moles) and hydroquinone (2 grams) is heated to 40° C., and a mercury resin catalyst (60 grams) of the composition used in Example V is added. The reaction mixture is maintained at 40° C. with stirring for 16 hours, separated from the catalyst by decantation, washed with water and aqueous sodium bicarbonate solution, dried over magnesium sulfate, and then distilled through a 12" column packed with berl saddles to give vinyl 4-pentenoate (711 grams, 56% yield) boiling at 65° C. (40 mm.).

$C_7H_{10}O_2$: Calculated: C, 66.66%; H, 7.93%. Found: C, 66.54%; H, 7.80%.

Example X

*Malic acid.*—A mixture of malic acid (17.4 grams, 0.13 mole) and vinyl acetate (129 grams, 1.5 moles) is heated to 35° C., and a mercury resin catalyst (8 grams) of the composition used in Example V is added. The reaction mixture is maintained at 35° C. with stirring for 17 hours, decanted from the resin catalyst, washed with water and aqueous sodium carbonate solution, and then distilled through a 6" Vigreux column to give a colorless liquid, B.P. 89–91° C. (1 mm.), having the empirical formula $C_8H_{10}O_5$ (14 grams, 58% yield).

$C_8H_{10}O_5$: Calculated: C, 51.60%; H, 5.39%. Found: C, 51.80%; H, 5.49%.

Example XI

*Adipic acid.*—A mixture of adipic acid (110 grams, 0.75 mole), vinyl acetate (344 grams, 4.0 moles), hydroquinone (1 gram) and a mercury resin catalyst (7 grams), as prepared in Example II, is heated under reflux with stirring for 2 hours. The reactants form a homogeneous solution in 20 minutes. This is separated from the solid catalyst by decantation at the end of the reaction period, washed with water, and then extracted with 5% aqueous sodium bicarbonate solution. The organic layer is dried over sodium sulfate, and then distilled through a Vigreux column to give divinyl adipate (41 grams, 27% yield), B.P. 66° C. (0.4 mm.). The alkaline extract is acidified with hydrochloric acid. The acidic solution is extracted with ether. The ethereal extract is dried over sodium sulfate, and then distilled to give vinyl hydrogen adipate (18 grams, 14% yield), B.P. 106–108° C. (0.3 mm.), M.P. 38–40° C.

Example XII

*Stearic acid.*—A glass coil of 6 millimeter inside diameter is filled with a mercury resin catalyst (11.75 grams), prepared as in Example II, having a residual salt-splitting cation capacity of 0.27 milliequivalent per gram. The coil is immersed in a constant temperature bath maintained at 45° C. A homogeneous mixture of stearic acid (341.5 grams, 1.2 moles) and vinyl acetate (516 grams, 6.0 moles) is pumped through the resin bed at about 2 milliliters per minute. The effluent product mixture is sampled periodically and the samples are analyzed for acetic acid formed during the transvinylation. From these values it is calculated that the conversion of stearic acid to the vinyl ester is consistently about 78–80% throughout the 7-hour period during which the stearic acid-vinyl acetate mixture is pumped through the catalyst bed. The excess vinyl acetate and the resulting acetic acid are stripped from the product, which is then dissolved in petane, chilled to 0° C. and filtered. When the pentane is removed, there remains pure vinyl stearate melting at 32° C.

Example XIII

A mixture of mercuric acetate (15.5 grams, 49 millimoles) and glacial acetic acid (150 grams) is heated to 60° C. A dried conventional sulfonic acid resin, Amberlite IR–120H (salt-splitting cation capacity 5.04 milliequivalents per gram; 10 grams, 50.4 milliequivalents), is added. The reaction mixture is maintained at 60° C. with stirring for 17 hours. The treated resin is recovered by filtration, washed with glacial acetate acid, and dried in vacuo at 50° C. The dried mercury derivative has a salt-splitting cation capacity of 3.02 milliequivalents per gram.

A mixture of benzoic acid (18.3 grams, 0.15 mole) and vinyl acetate (44.7 grams, 0.52 mole) is heated to 60° C. to form a homogeneous solution, and the above mercurated conventional resin (2.0 grams) is added. The mixture is maintained at 60° C. with stirring, but no reaction occurs after several hours. The unreacted benzoic acid is recovered by simple evaporation of vinyl acetate.

Example XIV

A mixture of benzoic acid (12.2 grams, 0.1 mole) and vinyl propionate (40 grams, 0.4 mole) is heated to 60° C. to form a homogeneous solution, and a macroreticular mercury resin catalyst (2 grams), as prepared in Example II, is added. The reaction mixture is maintained at 60° C. with stirring, and a conversion of 67% to vinyl benzoate and acetic acid is obtained after a 30-minute reaction period.

Example XV

A mixture of mercuric acetate (4.0 grams, 13 millimoles) and vinyl propionate (86 grams) is heated to 60° C. to form a homogeneous solution. A dry macroreticular sulfonic acid resin (6.75 grams, 32.4 milliequivalents), as prepared under conditions described in Preparation A, is added. The reaction mixture is maintained at 60° C. with stirring for 16 to 17 hours. The treated resin is collected by filtration, rinsed with vinyl propionate, and dried in vacuo at 60° C.

The dried mercury derivative is active in the transvinylation of benzoic acid with vinyl acetone under conditions described in Example IV. A conversion of 55% to vinyl benzoate is obtained after a 2-hour reaction period.

Example XVI

A mixture of mercuric acetate (4.0 grams, 13 millimoles) and the vinyl esters of linseed fatty acids (86 grams) is heated to 60° C., and a dry macroreticular sulfonic acid (6.75 grams, 32.4 milliequivalents), as prepared under conditions described in Preparation A, is added. The reaction mixture is maintained at 60° C. with stirring for 16 to 17 hours. The treated resin is collected by filtration, rinsed with vinyl acetate to remove the higher boiling vinyl esters, and dried in vacuo at 60° C.

The dried mercury resin derivative is active in the transvinylation of benzoic acid with vinyl acetate under conditions described in Example IV.

Example XVII

A mixture of mercuric acetate (61.6 grams, 193 millimoles) and 4-pentenoic acid (500 grams) is heated to 60° C., and a dry macroreticular sulfonic acid resin (40.0 grams, 193 milliequivalents), as prepared under conditions described in Preparation A, is added. The reaction mixture is maintained at 60° C. with stirring for 16 to 17 hours. The treated resin is recovered by filtration, washed with 4-pentenoic acid, and dried in vacuo at 60° C.

The mercury resin derivative is active in vinylation reaction.

Example XVIII

A reaction vessel is fitted with a mechanical stirrer, a reflux condenser, a thermometer, and a gas inlet adapted which is connected to an acetylene source through a purification train consisting of water, concentrated sulfuric acid, anhydrous magnesium sulfate and charcoal. The vessel is charged with glacial acetic acid (60 grams, 1.0 mole) and a mercury resin catalyst (20 grams), as prepared in Example II. Acetylene is passed through the mixture with stirring at a rate of 110 milliliters per minute, resulting in an exothermic reaction. The reaction mixture is maintained at 30–35° C. for 3 hours, separated from the solid catalyst by filtration, and distilled through a Vigreux column to give vinyl acetate (26 grams, 0.3 mole) boiling at 72–73° C.

*Example XIX*

A reaction vessel, similar to that described in Example XVIII, is charged with n-butyric acid (88 grams, 1.0 mole) and a mercury resin catalyst (20 grams), as prepared in Example II. Purified acetylene is passed through the mixture with stirring at a rate of 40 milliliters per minute, while an exothermic reaction maintains the temperature between 40° and 47° C. After 2 hours, the reaction mixture is separated from the solid catalyst by filtration, and then distilled through a Vigreux column to give vinyl n-butyrate (17 grams, 0.15 mole) boiling at 114–116° C.

*Example XX*

A reaction vessel, similar to that described in Example XVIII, is charged with chloroacetic acid (95 grams), as 1.0 mole) and a mercury resin catalyst (20 grams), as prepared in Example II. Purified acetylene is passed through the mixture with stirring at a rate of 70 milliliters per minute, and the usual exotherm is observed. The reaction temperature is maintained between 50° and 60° C. to avoid solidification of chloroacetic acid. After 2 hours and 15 minutes, the reaction mixture is separated from the solid catalyst by filtration, and then distilled through a Vigreux column to give vinyl chloroacetate (30 grams, 0.25 mole) boiling at 42° C. (20 mm.).

We claim:

1. A mercuric vinylation catalyst of the formula $$R-SO_3HgSO_3-R$$

in which R represents a backbone of a macroreticular-structured ion exchange resin.

2. A compound as set forth in claim 1 in which R represents a divinylbenzene copolymer containing 3% to 55% divinylbenzene with a monomer selected from the group consisting of styrene and ethylstyrene.

3. A vinylation cataylst of the formula $$R-SO_3HgX$$

in which R represents a backbone of a macroreticular-structured sulfonic acid cation exchange resin, X represents the radical $$Y-\overset{O}{\underset{\|}{C}}-O-$$

and Y is selected from the group consisting of hydrogen and an alkyl group containing 1 to 7 carbon atoms.

4. A product as set forth in claim 3 in which R represents a backbone copolymer of divinylbenzene containing 3% to 55% divinylbenzene and a monomer selected from the group consisting of styrene and ethylstyrene, and X represents the acetate radical.

5. A vinylation catalyst of the formula $$R-SO_3Hg-OH$$

in which R represents a backbone polymer of a macroreticular-structured sulfonic acid cation exchange resin.

6. A compound as set forth in claim 5 in which R represents a divinylbenzene copolymer containing 3% to 55% divinylbenzene with a monomer selected from the group consisting of styrene and ethylstyrene.

7. A vinylation catalyst of the formula $$R-SO_3HgCH_2CH(X)_2$$

in which R represents a backbone polymer of a macroreticular-structured sulfonic acid cation exchange resin and X represents a monocarboxylic aliphatic acid radial, having the structural confiiguration, $$Y-\overset{O}{\underset{\|}{C}}-O-$$

and containing 1 to 8 carbon atoms.

8. A compound as set forth in claim 7 in which R represents a divinylbenzene copolymer containing 3% to 55% divinylbenzene with a monomer selected from the group consisting of styrene and ethylstyrene.

9. A process for vinylation of carboxylic acids which comprises reacting said acids with a compound selected from the group consisting of a vinyl ester of a lower alkanoic acid and acetylene in the presence of a mercuric salt of a macroreticular-structured sulfonic acid cation exchange resin.

10. A process as set forth in claim 9 in which the reaction temperature is in the range 0 to 100° C. and the reaction time is 1 to 24 hours, the shorter time being at the higher temperatures.

11. A process as set forth in claim 9 in which the vinyl ester is vinyl acetate.

12. A process as set forth in claim 9 in which the macroreticular-structured sulfonic acid cation exchange resin is a sulfonated copolymer of divinylbenzene and a monomer selected from the group consisting of styrene and ethylstyrene, said copolymer containing 3% to 55% divinylbenzene.

13. A process as set forth in claim 9 in which the mercuric salt of a macroreticular-structured sulfonic acid cation exchange resin is the monosulfonate.

14. A process as set forth in claim 9 in which the macroreticular-structured sulfonic acid cation exchange resin is a sulfonated copolymer of divinylbenzene and a monomer selected from the group consisting of styrene and ethylstyrene, said copolymer containing 20% to 55% divinylbenzene.

References Cited by the Examiner

UNITED STATES PATENTS

| | | | |
|---|---|---|---|
| 2,329,644 | 9/43 | Owens | 260—498 |
| 2,339,126 | 1/44 | Wolfram | 260—498 |
| 2,398,820 | 4/46 | Coppock et al. | 260—498 |
| 2,853,520 | 9/58 | Newman | 260—2.2 |
| 3,037,052 | 5/62 | Bortnick | 260—2.2 |
| 3,135,784 | 6/64 | Feder | 260—498 |

OTHER REFERENCES

Rohm and Haas Co., Macroreticular Anion Exchanges, IE–81–63 (October 1963), 2 pages.

Kunin, Ion Exchange Resins, pages 249–255, John Wiley & Sons (1958).

WILLIAM H. SHORT, *Primary Examiner.*

JOSEPH L. SCHOFER, *Examiner.*